United States Patent
Lim et al.

(10) Patent No.: US 10,673,073 B2
(45) Date of Patent: Jun. 2, 2020

(54) CATHODE MATERIAL FOR ALL-SOLID STATE BATTERY INCLUDING COATING LAYER FOR PREVENTING DIFFUSION AND METHOD FOR PREPARING THE SAME

(71) Applicants: Hyundai Motor Company, Seoul (KR); Kia Motors Corporation, Seoul (KR); Korea Institute of Science and Technology, Seoul (KR)

(72) Inventors: Jae Min Lim, Suwon-Si (KR); Ju Yeong Seong, Hwaseong-si (KR); Yong Jun Jang, Seongnam-si (KR); Hyoung Chul Kim, Seoul (KR); Hun Gi Jung, Seoul (KR); Sung Jun Choi, Seoul (KR); Eu Deum Jung, Seoul (KR)

(73) Assignees: Hyundai Motor Company, Seoul (KR); Kia Motors Corporation, Seoul (KR); Korea Institute of Science and Technology, Seoul (KR)

(*) Notice: Subject to any disclaimer, the term of this patent is extended or adjusted under 35 U.S.C. 154(b) by 74 days.

(21) Appl. No.: 15/831,119

(22) Filed: Dec. 4, 2017

(65) Prior Publication Data

US 2018/0323435 A1    Nov. 8, 2018

(30) Foreign Application Priority Data

May 8, 2017 (KR) .................. 10-2017-0057493

(51) Int. Cl.
*H01M 4/62*    (2006.01)
*H01M 10/0525*    (2010.01)
(Continued)

(52) U.S. Cl.
CPC ............ *H01M 4/628* (2013.01); *C01G 33/00* (2013.01); *C01G 35/00* (2013.01); *C01G 35/006* (2013.01); *C01G 53/006* (2013.01); *C01G 53/50* (2013.01); *H01M 4/366* (2013.01); *H01M 4/485* (2013.01); *H01M 4/505* (2013.01); *H01M 4/525* (2013.01); *H01M 10/0525* (2013.01); *H01M 10/0562* (2013.01); *C01P 2004/04* (2013.01); *C01P 2004/84* (2013.01); *H01M 2004/021* (2013.01); *H01M 2004/028* (2013.01); *H01M 2300/0068* (2013.01)

(58) Field of Classification Search
None
See application file for complete search history.

(56) References Cited

U.S. PATENT DOCUMENTS

| 2005/0158625 A1* | 7/2005 | Im ..................... C01G 45/1221 429/231.1 |
| 2009/0068563 A1* | 3/2009 | Kanda .................... H01M 4/13 429/306 |

(Continued)

FOREIGN PATENT DOCUMENTS

KR    10-2015-0093542 A    8/2015

*Primary Examiner* — Eli S Mekhlin
(74) *Attorney, Agent, or Firm* — Morgan, Lewis & Bockius LLP

(57) ABSTRACT

A cathode material may include a coating layer capable of preventing transition metal cations from being diffused between a cathode active material and a solid electrolyte when an all-solid state battery is charged and discharged, and a method for preparing the same.

3 Claims, 11 Drawing Sheets

(51) Int. Cl.
*H01M 4/36* (2006.01)
*H01M 4/505* (2010.01)
*H01M 4/525* (2010.01)
*C01G 35/00* (2006.01)
*C01G 53/00* (2006.01)
*H01M 10/0562* (2010.01)
*C01G 33/00* (2006.01)
*H01M 4/485* (2010.01)
*H01M 4/02* (2006.01)

(56) References Cited

U.S. PATENT DOCUMENTS

2009/0317664 A1* 12/2009 Niessen ............ H01M 6/40
  429/7
2013/0260250 A1* 10/2013 Yada ............... H01G 11/50
  429/223

* cited by examiner

CATHODE MATERIAL FOR ALL-SOLID STATE BATTERY INCLUDING COATING LAYER FOR PREVENTING DIFFUSION AND METHOD FOR PREPARING THE SAME

CROSS-REFERENCE TO RELATED APPLICATION

The present application claims priority to Korean Patent Application No. 10-2017-0057493 filed May 8, 2017, the entire contents of which is incorporated herein for all purposes by this reference.

BACKGROUND OF THE INVENTION

Field of the Invention

The present invention relates to a cathode material including a coating layer capable of preventing diffusion of transition metal cations between a cathode active material and a solid electrolyte when an all-solid state battery is charged and discharged and a method for preparing the same.

Description of Related Art

An all-solid state battery using a solid electrolyte is known as a lithium-ion secondary battery. The all-solid state battery includes an electrolyte layer including the solid electrolyte, electrodes (cathode and anode) formed on two surfaces of the electrolyte layer, and a current collector bonded to each electrode. A sulfide-based solid electrolyte having high lithium ion conductivity is mainly used as the solid electrolyte.

Transition metal oxide including lithium ions has been used as a cathode active material, and since the cathode active material has low lithium ion conductivity, generally, the solid electrolyte is included in the cathode.

However, the reactivity between the solid electrolyte and the cathode active material in the cathode is a factor that largely deteriorates the performance of the all-solid state battery. The reason is that during charging and discharging of the all-solid state battery, the transition metal cations are diffused between the solid electrolyte and the cathode active material, and thus, the interface resistance is increased and the material is deteriorated.

As a result, in related art, a method of coating a ceramic complex on the surface of a cathode active material is proposed. However, in the related art, in order to uniformly form the coating layer, a complicated chelating agent is used and a water-based method based on pH control is adopted. As a result, since there are problems such as excessive organic material content, high surface tension of water, low wettability, and agglomeration in a drying process, it is difficult to implement a desired degree of coating uniformity and the nano-sized coating layer may not be formed, and thus, the interface resistance between the cathode active material and other materials is increased.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a cathode material in which a coating layer is evenly formed on a cathode active material to prevent diffusion of transition metal cations and a method for preparing the same.

The present invention, in various aspects, has also been made in an effort to provide a cathode material including a coating layer formed with a nano-sized thickness and a method for preparing the same.

The present invention, in various aspects, has also been made in an effort to provide a cathode material including a coating layer made of a compound of transition metals of Groups 4 to 6 which may efficiently prevent diffusion of the transition metal cations and a method for preparing the same.

The present invention, in various aspects, has also been made in an effort to provide a method for easily preparing a cathode material including the coating layer having the above features.

The objects of the present invention are not limited to the objects described above. The objects of the present invention will be more apparent in the description below and implemented by means described in the claims and a combination thereof.

Various aspects of the present invention are directed to providing a cathode material for an all-solid state battery including: a cathode active material that may absorb and emit lithium ions; and a coating layer that is formed on the cathode active material and made of a compound represented by the following Chemical Formula 1:

$$Li(M1_xM2_{1-x})O_3$$

In various exemplary embodiments, the M1 is an element selected from the group consisting of aluminum (Al), silicon (Si), niobium (Nb), titanium (Ti), and combinations thereof, the M2 is an element selected from the group consisting of tantalum (Ta), vanadium (V), and combinations thereof, and 0.4<x<1.0. In other words, x can be greater than 0.4 and less than 1.0. In various exemplary embodiments, x is 0.5, 0.6, 0.7, 0.8, 0.85, 0.9, or the like In an exemplary embodiment of the present invention, the M1 may be niobium (Nb), the M2 may be tantalum (Ta), and 0.6≤x<1.0. In some cases, x is less than or equal to 0.6 and less than 1.0. For example, x is 0.6, 0.65, 0.7, 0.8, 0.9, or the like.

In another exemplary embodiment, the cathode active material may be lithium transition metal oxide.

In yet another exemplary embodiment, the cathode active material may have a hydroxyl group on the surface.

In yet another exemplary embodiment, a thickness of the coating layer may be about 1 nm to about 100 nm (e.g., about 1 nm, about 5 nm, about 10 nm, about 15 nm, about 20 nm, about 25 nm, about 30 nm, about 35 nm, about 40 nm, about 45 nm, about 50 nm, about 55 nm, about 60 nm, about 65 nm, about 70 nm, about 75 nm, about 80 nm, about 85 nm, about 90 nm, about 91 nm, about 92 nm, about 93 nm, about 94 nm about 95 nm, about 96 nm, about 97 nm, 98 nm, about 99 nm, or about 100 nm).

In still yet another exemplary embodiment, the content of the coating layer may be about 0.125 wt % to about 0.25 wt % (e.g., about 0.125 wt %, about 0.130 wt %, about 0.140 wt %, about 0.150 wt %, about 0.160 wt %, about 0.170 wt %, about 0.175 wt %, about 0.180 wt %, about 0.190 wt %, about 0.200 wt %, about 0.210 wt %, about 0.220 wt %, about 0.225 wt %, about 0.230 wt %, about 0.240 wt %, about 0.250 wt %) with respect to 100 wt % of the cathode material.

Various aspects of the present invention are directed to providing a method for preparing a cathode material for an all-solid state battery, the method including: preparing a precursor solution by dissolving an Li precursor, an M1 precursor and an M2 precursor in an alcohol-based solvent; mixing the precursor solution with a cathode active material powder; obtaining a coating powder by spray-drying the precursor solution; and obtaining the cathode material by heat-treating the coating powder.

In an exemplary embodiment of the present invention, the alcohol-based solvent may be an anhydrous ethanol having the purity of 99% or more.

In another exemplary embodiment, the cathode active material powder may be treated with oxygen plasma to have a hydroxyl group on the surface.

In yet another exemplary embodiment, the spray-drying may be performed by using spray-drying equipment including a spray-drying chamber and a collection chamber, and performed under a condition in which the spray-drying chamber is adjusted to a temperature of about 60° C. to about 120° C. (e.g., about 60° C. to about 120° C., about 70° C. to about 120° C., about 80° C. to about 120° C., about 90° C. to about 120° C., about 100° C. to about 120° C., about 60° C. to about 110° C., about 60° C. to about 100° C., or about 60° C. to about 90° C.) and the collection chamber is adjusted to a temperature of about 100° C. to about 150° C. (e.g., about 100° C. to about 150° C., about 110° C. to about 150° C., about 115° C. to about 150° C., about 120° C. to about 150° C., about 125° C. to about 150° C., about 130° C. to about 150° C., about 140° C. to about 150° C., about 100° C. to about 110° C., about 110° C. to about 120° C., about 110° C. to about 130° C., or about 100° C. to about 140° C.).

In yet another exemplary embodiment, the method may further include drying the coating powder at about 15° C. to about 25° C. (e.g., about 15° C., about 16° C., about 17° C., about 18° C., about 19° C., about 20° C., about 21° C., about 22° C., about 23° C., about 24° C., or about 25° C.) for 10 minutes to 2 hours (e.g., about 10 minutes to about 2 hours, about 30 minutes to about 2 hours, about 10 minutes to about 1 hours, or about 60 minutes to about 2 hours) before heat-treating the coating powder.

In still yet another exemplary embodiment, the heat-treating may be performed at a temperature of about 500° C. to about 700° C. (e.g., about 500° C., about 550° C., about 600° C., about 650° C., or about 700° C.) for about 3 to about 5 hours (e.g., about 3 hours, 3.5 hours, 4 hours, 4.5 hours, or 5 hours) under air atmosphere.

Various aspects of the present invention are directed to providing a cathode material for an all-solid state battery including: a cathode active material that may absorb and emit lithium ions; and a coating layer which is formed by a plurality of layers on the cathode active material and has each layer made of a compound represented by the following Chemical Formula 2:

$Li(M3)O_3$. [Chemical Formula 2]

In various exemplary embodiments, the M3 is an element selected from the group consisting of aluminum (Al), silicon (Si), niobium (Nb), titanium (Ti), tantalum (Ta), and vanadium (V).

In an exemplary embodiment of the present invention, the coating layer may be formed on the cathode active material and include a first coating layer made of a compound represented by the following Chemical Formula 3:

$LiTaO_3$, and [Chemical Formula 4]

a second coating layer formed on the first coating layer and made of a compound represented by the following Chemical Formula 4:

$LiNbO_3$. [Chemical Formula 4]

In another exemplary embodiment, the coating layer may be formed on the cathode active material and include a first coating layer made of a compound represented by the following Chemical Formula 4:

$LiNbO_3$, and [Chemical Formula 4]

a second coating layer formed on the first coating layer and made of a compound represented by the following Chemical Formula 3:

$LiTaO_3$. [Chemical Formula 3]

In yet another exemplary embodiment, the cathode active material may be lithium transition metal oxide.

In yet another exemplary embodiment, the cathode active material may have a hydroxyl group on the surface.

In still yet another exemplary embodiment, a thickness of the coating layer may be about 1 nm to about 100 nm.

In a further exemplary embodiment, the content of the coating layer may be 0.125 wt % to 0.25 wt % with respect to 100 wt % of the cathode material.

Various aspects of the present invention are directed to providing a method for preparing a cathode material for an all-solid state battery, the method including: preparing a precursor solution by dissolving an Li precursor and an M3 precursor in an alcohol-based solvent; mixing the precursor solution with a cathode active material powder; obtaining a coating powder by spray-drying the precursor solution; heat-treating the coating powder; and obtaining the cathode material by repeating the processes and using the heat-treated coating powder instead of the cathode active material powder.

In an exemplary embodiment of the present invention, the method may include (a) preparing a first precursor solution by dissolving an Li precursor and a Ta precursor in an alcohol-based solvent, (b) mixing a cathode active material powder with the first precursor solution, (c) obtaining a first coating powder by spray-drying the first precursor solution, (d) forming a first coating layer made of a compound represented by the following Chemical Formula 3 on the cathode active material powder by heat-treating the first coating powder;

$LiTaO_3$ [Chemical Formula 3]

(e) preparing a second precursor solution by dissolving an Li precursor and a Nb precursor in the alcohol-based solvent, (f) mixing a cathode active material powder with the first coating layer with the second precursor solution, (g) obtaining a second coating powder by spray-drying the second precursor solution, and (h) forming a second coating layer made of a compound represented by the following Chemical Formula 4 on the first coating layer by heat-treating the second coating powder, wherein $LiNbO_3$. [Chemical Formula 4]

In another exemplary embodiment, the method may further include (i) preparing a first precursor solution by dissolving an Li precursor and a Nb precursor in the alcohol-based solvent, (ii) mixing a cathode active material powder with the first precursor solution, obtaining a first coating powder by spray-drying the first precursor solution, (iii) forming a first coating layer made of a compound represented by the following Chemical Formula 4 on the cathode active material powder by heat-treating the first coating powder:

  [Chemical Formula 4]

(iv) preparing a second precursor solution by dissolving an Li precursor and a Ta precursor in an alcohol-based solvent, (v) mixing a cathode active material powder with the first coating layer with the second precursor solution, (vi) obtaining a second coating powder by spray-drying the second precursor solution, and (vii) forming a second coating layer made of a compound represented by the following Chemical Formula 3 on the first coating layer by heat-treating the second coating powder, wherein

  [Chemical Formula 3]

In yet another exemplary embodiment, the alcohol-based solvent may be an anhydrous ethanol having the purity of 99% or more.

In yet another exemplary embodiment, the cathode active material powder may be treated with oxygen plasma to have a hydroxyl group on the surface.

In still yet another exemplary embodiment, the spray-drying may be performed by using spray-drying equipment including a spray-drying chamber and a collection chamber and performed under a condition in which the spray-drying chamber is adjusted to a temperature of about 60° C. to about 120° C. (e.g., about 60° C. to about 120° C., about 70° C. to about 120° C., about 80° C. to about 120° C., about 90° C. to about 120° C., about 100° C. to about 120° C., about 60° C. to about 110° C., about 60° C. to about 100° C., or about 60° C. to about 90° C.), and the collection chamber is adjusted to a temperature of about 100° C. to about 150° C. (e.g., about 100° C. to about 150° C., about 110° C. to about 150° C., about 115° C. to about 150° C., about 120° C. to about 150° C., about 125° C. to about 150° C., about 130° C. to about 150° C., about 140° C. to about 150° C., about 100° C. to about 110° C., about 110° C. to about 120° C., about 110° C. to about 130° C., or about 100° C. to about 140° C.).

In a further exemplary embodiment, the method may further include drying the coating powder at about 15° C. to about 25° C. (e.g., about 15° C., about 16° C., about 17° C., about 18° C., about 19° C., about 20° C., about 21° C., about 22° C., about 23° C., about 24° C., or about 25° C.) for 10 minutes to 2 hours (e.g., about 10 minutes to about 2 hours, about 30 minutes to about 2 hours, about 10 minutes to about 1 hours, or about 60 minutes to about 2 hours) before heat-treating the coating powder.

In another further exemplary embodiment, the heat-treating may be performed at a temperature of about 500° C. to about 700° C. (e.g., about 500° C., about 550° C., about 600° C., about 650° C., or about 700° C.) for about 3 hours to about 5 hours (e.g., about 3 hours, 3.5 hours, 4 hours, 4.5 hours, or 5 hours) under air atmosphere.

According to the exemplary embodiment of the present invention, since the cathode material is prepared by an alcohol-based method, it is possible to form the coating layer made of a compound of transition metals of Groups 4 to 6 such as niobium (Nb) which may efficiently prevent diffusion of the transition metal cations. Accordingly, it is possible to obtain an all-solid state battery with improved charge/discharge performance by reducing an interface resistance between the cathode active material and the solid electrolyte.

It is also possible to prevent an increase in interface resistance by the coating layer by forming the coating layer with a nano-sized thickness.

It is also possible to significantly improve productivity, price competitiveness, and the like of the all-solid state battery by forming the coating layer by a simple method without adding a complicated chelating agent which is difficult to adjust pH and be used.

The effects of the present invention are not limited to the aforementioned effects. It should be understood that the effects of the present invention include all effects inferable from the description below.

Other aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

The above and other features of the invention are discussed infra.

BRIEF DESCRIPTION OF THE DRAWINGS

FIG. 3A illustrates a result for a cathode material in Example 1, and FIG. 3B illustrates a result for a cathode material prepared by the same composition and method as Example 1, except that the surface of a cathode active material powder is not treated with oxygen plasma;

FIG. 4A illustrates an image of the cathode material of Example 1, FIG. 4B illustrates element mapping data of the cathode material of Example 1, and FIG. 4C illustrates a profile of each element up to a predetermined depth from the surface of the cathode material of Example 1;

FIG. 5A illustrates an image of the cathode material of Example 3, FIG. 5B illustrates element mapping data of the cathode material of Example 3, and FIG. 5C illustrates a profile of each element up to a predetermined depth from the surface of the cathode material of Example 3;

FIG. 6A illustrates an image of the cathode material of Example 4, FIG. 6B illustrates element mapping data of the cathode material of Example 4, and FIG. 6C illustrates a profile of each element up to a predetermined depth from the surface of the cathode material of Example 4;

Figure 1:
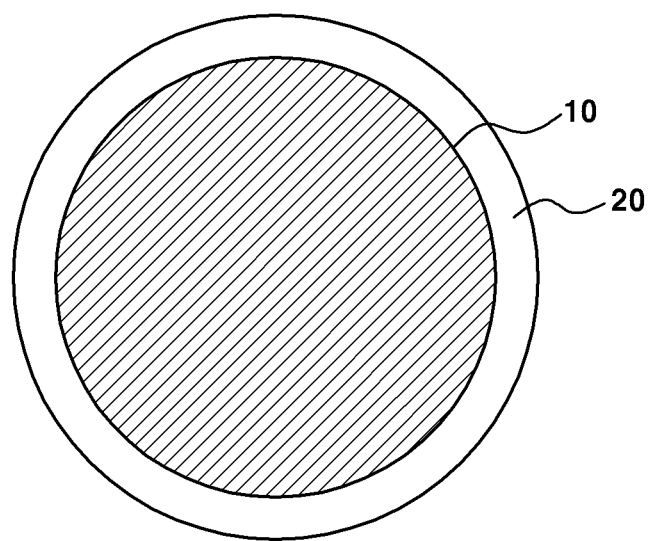
FIG. 1 is a diagram illustrating a cathode material according to various exemplary embodiments of the present invention.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, the present invention will be described in detail through exemplary embodiments. The exemplary embodiments of the present invention may be modified in various forms as long as the gist of the invention is not changed. However, the scope of the present invention is not limited to the following exemplary embodiments.

When it is determined that the description for the known configurations and functions may obscure the gist of the present invention, the description for the known configurations and functions will be omitted. In the present specification, the term "comprise" means that other constituent elements may be further included unless otherwise listed.

Various exemplary embodiments of the present invention is as follows.

As illustrated in FIG. 1, various aspects of the present invention are directed to providing a cathode material for an all-solid state battery including a cathode active material 10 that may absorb and emit lithium ions and a coating layer 20 which is formed on the cathode active material 10 and made of a compound represented by the following Chemical Formula 1:

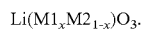

In some cases, the M1 is an element selected from the group consisting of aluminum (Al), silicon (Si), niobium (Nb), titanium (Ti), and combinations thereof, the M2 is an element selected from the group consisting of tantalum (Ta), vanadium (V), and combinations thereof, and 0.4<x<1.0. Particularly, the M1 is niobium (Nb), the M2 is tantalum (Ta), and 0.6≤x<1.0.

The cathode active material 10 may use any cathode active material which may absorb and emit lithium ions, preferably may use lithium transition metal oxide, and particularly, may be selected from the group consisting of $LiCoO_2$, $LiNiO$, $LiMnO_2$, $LiMn_2O_4$, $Li(Ni_aCo_bMn_c)O_2$ (0<a<1, 0<b<1, 0<c<1, a+b+c=1), $Li(Ni_aCo_bAl_c)O_2$ (0<a<1, 0<b<1, 0<c<1, a+b+c=1), $LiNi_{1-y}Co_yO_2$ (0≤y<1), $LiCo_{1-y}Mn_yO_2$ (0≤y<1), $LiNi_{1-y}Mn_yO_2$ (0≤y<1), $LiMn_{2-z}Ni_zO_4$ (0<z<2), $LiMn_{2-z}Co_zO_4$ (0<z<2), and combinations thereof.

The cathode active material 10 may have a hydroxyl group on the surface. The hydroxyl group may be formed by subjecting the surface of the cathode active material to oxygen plasma treatment and a detailed method will be described in the following contents and Examples for the preparation method.

Since sufficient electrostatic attraction is caused without adding additional organic material and chelating agent by forming the hydroxyl group on the surface of the cathode active material 10, precursors of the M1 and M2 may be evenly attached to the surface of the cathode active material and as a result, the coating layer 20 may be evenly formed with a uniform thickness.

An average particle size of the cathode active material is not particularly limited, but when the average particle size is too small, the coating layer may not be evenly formed, and when the average particle size is too large, the dispersibility may be deteriorated when the cathode active material is mixed with a precursor solution later. Accordingly, for example, the average particle size of the cathode active material may be 1 μm to 20 μm or 5 μm to 15 μm.

The coating layer needs to be made of a material that may conduct the lithium ions, but prevent diffusion of the transition metal cations. The coating layer may be formed of a compound in which in Chemical Formula 1, M1 is niobium (Nb), M2 is tantalum (Ta), and 0.4<x<1.0.

In the related art, the coating layer is formed by a water-based method, and a compound (alternatively, a precursor thereof) including transition metals of Groups 4 to 6 such as niobium (Nb) and tantalum (Ta) having a low solubility in water has an effect on prevention of diffusion of transition metal cations in various cathode active materials and thus, may not be used as a material of the coating layer even though availability is very good.

On the other hand, in an exemplary embodiment of the present invention, as described below, since the coating layer is formed by an alcohol-based method using a non-water based solvent such as anhydrous ethanol, a compound containing transition metals of Groups 4 to 6 such as niobium (Nb) and tantalum (Ta) may be applied.

Since $LiNbO_3$ and $LiTaO_3$ have the same R3c space group, there is no disadvantage according to a combination of the two compounds due to excellent compatibility between materials. It is known that the $LiNbO_3$ may prevent diffusion of transition metal cations for various cathode active materials. Meanwhile, the $LiTaO_3$ has high strain energy due to large density and rigidity and has an excellent effect of preventing the diffusion of transition metal cations. In the various exemplary embodiments of the present invention, some of niobium (Nb) contained in the $LiNbO_3$ is substituted with tantalum (Ta) in an appropriate ratio to form the coating layer by taking only merits of the two compounds without disadvantage according to the combination.

A thickness of the coating layer may be 1 nm to 100 nm and particularly 2 nm to 10 nm. In an exemplary embodiment of the present invention, since the cathode material is prepared by a method of mixing the precursor solution and the cathode active material and then spray-drying the mixture, the coating layer may be formed with a nano-sized thickness. The detailed contents will be described below.

The content of the coating layer may be 0.125 wt % to 0.25 wt % based on 100 wt % of the cathode material. When the content of the coating layer is too small, it is difficult to evenly form the coating layer on the surface of the cathode active material and when the content is too large, the thickness becomes too thick and thus, the interface resistance may be increased.

Hereinafter, a method for preparing the cathode material will be described in detail.

The method for preparing the cathode material according to an exemplary embodiment of the present invention includes preparing a precursor solution by dissolving an Li precursor, an M1 precursor and an M2 precursor in an alcohol-based solvent, mixing the precursor solution with a cathode active material powder, obtaining a coating powder by spray-drying the precursor solution, and heat-treating the coating powder.

First, in an exemplary embodiment of the present invention, the precursor solution is prepared by dissolving the Li precursor, the M1 precursor and the M2 precursor in the alcohol-based solvent. Unlike the water-based method in the related art, since the precursor solution is prepared by the alcohol-based method, it is easy to apply the transition metal precursors of Groups 4 to 6 such as niobium (Nb) having the low solubility in water.

The Li precursor may be nitrates, sulfates, carbonates, chlorides, acetates or mixtures thereof, which contain lithium (Li).

The M1 precursor may be ethoxide containing an element selected from aluminum (Al), silicon (Si), niobium (Nb), titanium (Ti), and combinations thereof.

The M2 precursor may be ethoxide containing an element selected from tantalum (Ta), vanadium (V), and combinations thereof.

The alcohol-based solvent may be anhydrous ethanol having the purity of 97% or more, specifically 98% or more, more specifically 99% or more. However, a small amount of water may be partially mixed and used with the alcohol-based solvent according to the purpose.

Next, the precursor solution and the cathode active material powder are mixed.

The cathode active material powder means a powder type cathode active material and may have a hydroxyl group on the surface thereof as described above. Accordingly, the method for preparing the cathode material according to an exemplary embodiment of the present invention may further include forming a hydroxyl group on the surface by subjecting the cathode active material powder to oxygen plasma treatment at about 200 mTorr to 400 mTorr for about 1 minute to 10 minutes. However, if the hydroxyl group is formed on the surface of the cathode active material powder, any method other than oxygen plasma treatment may be used, and for example, a surface treatment method based on various gases and organic precursors may also be used.

Since sufficient electrostatic attraction is caused without adding additional organic materials and a chelating agent by forming the hydroxyl group on the surface of the cathode active material powder, the M1 and M2 precursors may be evenly attached to the surface of the cathode active material and as a result, the coating layer may be evenly formed with a uniform thickness.

Next, the mixed solution of the precursor solution and the cathode active material powder is spray dried to obtain the coating powder.

The coating powder means a powder in which the Li precursor, the M1 precursor and the M2 precursor are coated and dried on the surface of the cathode active material powder with a nano-sized thickness.

The spray-drying of the mixed solution may be performed by using spray and drying equipment including a spray-drying chamber and a collection chamber.

After the mixed solution is added to the spray-drying chamber, the cathode active material powder in the state where Li precursor, the M1 precursor and the M2 precursor are attached on the surface is spray-dried to form micro-sized droplets. The droplets are converted into an aerosol form to minimize the capillary force generated during agglomeration and drying of the precursors, and as a result, the precursors may be evenly coated on the surface of the cathode active material powder with a nano-sized thickness.

An additional heating device is installed in the collection chamber included in the spray-drying equipment to perform coating and drying of the precursors at the same time.

The spray-drying may be performed by adjusting the temperature in the spray-drying chamber to 60° C. to 120° C., particularly, adjusting the inlet and the outlet of the spray-drying chamber to a temperature of about 120° C. and about 60° C., respectively. Furthermore, the coating and drying of the precursors may be performed at the same time by adjusting the collection chamber to a temperature of 100° C. to 150° C.

The present invention may further include additionally drying the coating powder obtained through the spray-drying. The remaining alcohol-based solvent is removed by drying the coating powder once more to prevent undesired side reaction from occurring. Particularly, before the heat-treating of the coating powder, the coating powder may be dried under conditions of about 10 minutes to 2 hours and about 15° C. to 25° C.

Next, the aforementioned cathode material is obtained by heat-treating the coating powder. The heat-treating may be performed at a temperature of 500° C. to 700° C. for 3 to 5 hours under air atmosphere. The cathode material is described above and will be omitted below.

Various exemplary embodiments of the present invention is as follows.

Figure 2:
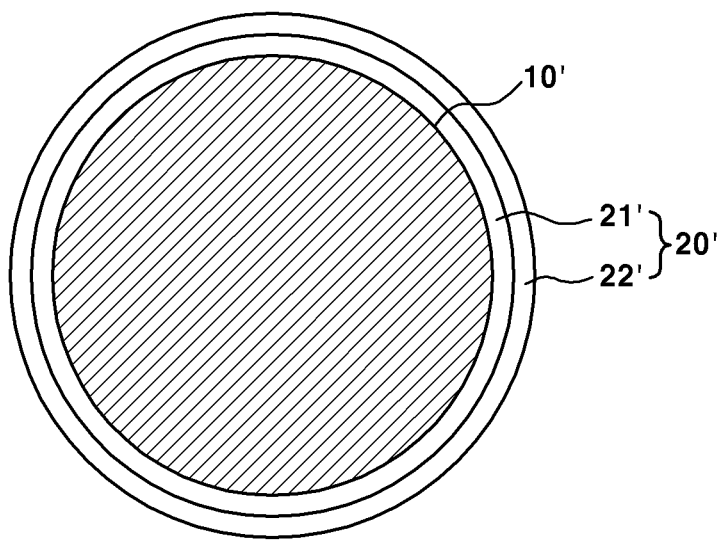
FIG. 2 is a diagram illustrating a cathode material according to various exemplary embodiments of the present invention.

As illustrated in FIG. 2, various aspects of the present invention are directed to providing a cathode material for an all-solid state battery including a cathode active material 10' that may absorb and emit lithium ions and a coating layer 20' which is formed by a plurality of layers on the cathode active material and has each layer made of a compound represented by the following Chemical Formula 2:

$Li(M3)O_3$. [Chemical Formula 2]

In various exemplary embodiments, the M3 is an element selected from the group consisting of aluminum (Al), silicon (Si), niobium (Nb), titanium (Ti), tantalum (Ta), and vanadium (V).

Particularly, in one example of the various exemplary embodiments of the present invention, the coating layer 20' is formed on the cathode active material 10' and may be configured by a first coating layer 21' made of a compound represented by the following Chemical Formula 3 and a second coating layer 22' formed on the first coating layer 21' and made of a compound represented by the following Chemical Formula 4.

In another example of the various exemplary embodiments of the present invention, the coating layer 20' is formed on the cathode active material 10' and may be configured by a first coating layer 21' made of a compound represented by the following Chemical Formula 4 and a second coating layer 22' formed on the first coating layer 21' and made of a compound represented by the following Chemical Formula 3.

$LiTaO_3$ [Chemical Formula 3]

$LiNbO_3$ [Chemical Formula 4]

In the various exemplary embodiments of the present invention, a separate layer containing $LiNbO_3$ and $LiTaO_3$ is formed on the cathode active material, but the various exemplary embodiments is similar to the various exemplary embodiments in that $LiNbO_3$ and $LiTaO_3$ are combined. Accordingly, like the various exemplary embodiments, the various exemplary embodiments may take only merits of the two compounds without disadvantages according to the combination of the two compounds.

The cathode material is described above and will be omitted below.

There is a difference from the various exemplary embodiments in that the coating layer 20' is formed by the plurality of layers, but since the thicknesses and the contents are substantially the same as each other, the description thereof will be omitted below.

Hereinafter, a method for preparing the cathode material will be described in detail.

The method for preparing the cathode material according to an exemplary embodiment of the present invention includes preparing a precursor solution by dissolving an Li precursor, and an M3 precursor in an alcohol-based solvent, mixing the precursor solution with a cathode active material powder, obtaining a coating powder by spray-drying the precursor solution, heat-treating the coating powder, and obtaining the cathode material by repeating the processes and using the coating powder instead of the cathode active material powder.

First, in an exemplary embodiment of the present invention, the precursor solution is prepared by dissolving the Li precursor and the M3 precursor in the alcohol-based solvent.

The Li precursor may be nitrates, sulfates, carbonates, chlorides, acetates or mixtures thereof, which contain lithium (Li), and the M3 precursor may be ethoxide containing aluminum (Al), silicon (Si), niobium (Nb), titanium (Ti), or tantalum (Ta).

The alcohol-based solvent may be anhydrous ethanol having the purity of 97% or more, specifically 98% or more, more specifically 99% or more. However, a small amount of water may be partially mixed and used with the alcohol-based solvent according to the purpose.

Next, the precursor solution and the cathode active material powder are mixed and then spray dried to obtain the coating powder.

The coating powder means a powder in which the Li precursor and the M3 precursor are coated and dried on the surface of the cathode active material powder with a nano-sized thickness.

The equipment and the conditions used in the spray-drying are the same as described above and thus, will be omitted below.

The present invention may further include additionally drying the coating powder obtained through the spray-drying. The remaining alcohol-base solvent is removed by drying the coating powder once more to prevent undesired side reaction from occurring. Particularly, before the heat-treating of the coating powder, the coating powder may be dried under conditions of about 10 minutes to 2 hours and about 15° C. to 25° C.

Next, the coating powder is obtained in a form in which a first coating layer is formed on the cathode active material powder through the heat-treatment. The heat-treating may be performed at a temperature of 500° C. to 700° C. for 3 to 5 hours under air atmosphere.

Next, the aforementioned processes are repetitively performed to form a second coating layer on the first coating layer. Particularly, a new precursor solution is prepared by dissolving the Li precursor and an M3' precursor in an alcohol-based solvent. The coating powder with the first coating layer formed on the cathode active material powder is mixed with the precursor solution and then spray dried and heat-treated to finally obtain the cathode material.

In BRIEF SUMMARY, the method for preparing the cathode material according to one example of the various exemplary embodiments of the present invention includes preparing a first precursor solution by dissolving an Li precursor and a Ta precursor in an alcohol-based solvent, mixing a cathode active material powder with the first precursor solution, obtaining a first coating powder by spray-drying the first precursor solution, forming a first coating layer made of a compound represented by the following Chemical Formula 3 on the cathode active material powder by heat-treating the first coating powder, $LiTaO_3$ [Chemical Formula 3]

preparing a second precursor solution by dissolving an Li precursor and a Nb precursor in the alcohol-based solvent, mixing a cathode active material powder with the first coating layer with the second precursor solution, obtaining a second coating powder by spray-drying the second precursor solution, and forming a second coating layer made of a compound represented by the following Chemical Formula 4 on the first coating layer by heat-treating the second coating powder.

$LiNbO_3$ [Chemical Formula 4]

The method for preparing the cathode material according to another example of the various exemplary embodiments of the present invention includes preparing a first precursor solution by dissolving an Li precursor and a Nb precursor in an alcohol-based solvent, mixing a cathode active material powder with the first precursor solution, obtaining a first coating powder by spray-drying the first precursor solution, forming a first coating layer made of a compound represented by the following Chemical Formula 4 on the cathode active material powder by heat-treating the first coating powder, $LiNbO_3$ [Chemical Formula 4]

preparing a second precursor solution by dissolving an Li precursor and a Ta precursor in the alcohol-based solvent, mixing a cathode active material powder with the first coating layer with the second precursor solution, obtaining a second coating powder by spray-drying the second precursor solution, and forming a second coating layer made of a compound represented by the following Chemical Formula 3 on the first coating layer by heat-treating the second coating powder.

$$LiTaO_3 \quad \text{[Chemical Formula 3]}$$

Hereinafter, the present invention will be described in more detail through detailed Examples. However, these Examples are to exemplify the present invention and the scope of the present invention is not limited thereto.

EXAMPLES

The following examples illustrate the invention and are not intended to limit the same.

Example 1

Formation of Coating Layer Made of Li(Nb0.6Ta0.4)O3

Lithium nitrate as an Li precursor, niobium ethoxide as an M1 precursor, and tantalum ethoxide as an M2 precursor were dissolved in 40 ml of anhydrous ethanol to prepare a precursor solution. The lithium nitrate, the niobium ethoxide, and the tantalum ethoxide were used by weighing the composition of the coating layer to be $Li(Nb_{0.6}Ta_{0.4})O_3$ while the content of the coating layer to be finally formed is 0.25 wt % with respect to 100 wt % of the cathode material.

$LiNi_{0.6}Co_{0.2}Mn_{0.2}O_2$ (hereinafter, referred to as 'NCM') to be used as the cathode active material powder was subjected to oxygen plasma treatment for 1 minute at 200 mTorr to form a hydroxyl group on the surface thereof.

3.0 g of the surface-treated NCM was mixed with the precursor solution by using a stirrer.

The precursor solution mixed with the NCM was added to spray-drying equipment (a spray-drying chamber) in a condition of 40 rpm by using a liquid pump. In this case, the inlet of the spray-drying equipment was adjusted to 120° C., the outlet was adjusted to 60° C., and the collection chamber was adjusted to 120° C. through a heating device. The precursors in the precursor solution were attached to the surface of the NCM by spray-drying the precursor solution to obtain the coating powder in a dried state. The coating powder was additionally dried for 30 minutes.

The coating powder dried and collected was heat-treated under conditions of 600° C. and 5 hours under air atmosphere to obtain a cathode material including the cathode active material and the coating layer formed on the cathode active material and made of $Li(Nb_{0.6}Ta_{0.4})O_3$.

Example 2—Formation of Coating Layer Made of $Li(Nb_{0.8}Ta_{0.2})O_3$

A cathode material was prepared in the same manner as Example 1 except that the coating layer was made of $Li(Nb_{0.8}Ta_{0.2})O_3$.

Example 3—Formation of Coating Layer Made of LiNbO3 (Second Coating Layer)/LiTaO3 (First Coating Layer)

Lithium nitrate as an Li precursor and tantalum ethoxide as an M3 precursor were dissolved in 40 ml of anhydrous ethanol to prepare a first precursor solution. The lithium nitrate and the tantalum ethoxide were used by weighing the content of the first coating layer to be 0.125 wt % with respect to 100 wt % of the cathode material.

$LiNi_{0.6}Co_{0.2}Mn_{0.2}O_2$ (hereinafter, referred to as 'NCM') to be used as the cathode active material powder was subjected to oxygen plasma treatment for 1 minute at 200 mTorr to form a hydroxyl group on the surface thereof.

3.0 g of the surface-treated NCM was mixed with the first precursor solution by using a stirrer.

The first precursor solution mixed with the NCM was added to spray-drying equipment (a spray-drying chamber) in a condition of 40 rpm by using a liquid pump. In this case, the inlet of the spray-drying equipment was adjusted to 120° C., the outlet was adjusted to 60° C., and the collection chamber was adjusted to 120° C. through a heating device. The precursors in the first precursor solution were attached to the surface of the NCM by spray-drying the first precursor solution to obtain a first coating powder in a dried state. The first coating powder was additionally dried for 30 minutes.

The first coating powder dried and collected was heat-treated under conditions of 600° C. and 5 hours under air atmosphere to obtain a first coating layer made of $LiTaO_3$ on the NCM.

Lithium nitrate as an Li precursor and niobium ethoxide as an M3' precursor were dissolved in 40 ml of anhydrous ethanol to prepare a second precursor solution. The lithium nitrate and the niobium ethoxide were used by weighing the content of the second coating layer to be 0.125 wt % with respect to 100 wt % of the cathode material.

3 g of the NCM with the first coating layer was mixed with the second precursor solution by using a stirrer.

The second precursor solution was added to spray drying equipment (a spray drying chamber) in a condition of 40 rpm by using a liquid pump. In this case, the inlet of the spray drying equipment was adjusted to 120° C., the outlet was adjusted to 60° C., and the collection chamber was adjusted to 120° C. through a heating device. The precursors in the second precursor solution were attached to the surface of the first coating layer by spray-drying the second precursor solution to obtain a second coating powder in a dried state. The second coating powder was additionally dried for 30 minutes.

The second coating powder dried and collected was heat-treated under conditions of 600° C. and 5 hours under air atmosphere to obtain a cathode material including the cathode active material, the first coating layer formed on the cathode active material and made of $LiTaO_3$, and the second coating layer formed on the first coating layer and made of $LiNbO_3$.

Example 4—Formation of Coating Layer Made of LiTaO3 (Second Coating Layer)/LiNbO3 (First Coating Layer)

In order to form a first coating layer made of $LiNbO_3$ and a second coating layer made of $LiTaO_3$, the niobium ethoxide as the M3 precursor and the tantalum ethoxide as the M3' precursor in Example 3 were used. Otherwise, a cathode material was prepared by the same composition and method as Example 3.

Comparative Example 1

Formation of Coating Layer Made of LiTaO3

A cathode material was prepared in the same manner as Example 1 except that a coating layer was made of $LiTaO_3$.

Comparative Example 2

Formation of Coating Layer Made of Li(Nb$_{0.2}$Ta$_{0.8}$)O$_3$

A cathode material was prepared in the same manner as Example 1 except that a coating layer was made of Li(Nb$_{0.2}$Ta$_{0.8}$)O$_3$.

Comparative Example 3

Formation of Coating Layer Made of Li(Nb$_{0.2}$Ta$_{0.8}$)O$_3$

A cathode material was prepared in the same manner as Example 1 except that a coating layer was made of Li(Nb$_{0.4}$Ta$_{0.6}$)O$_3$.

Comparative Example 4

Formation of Coating Layer Made of LiNbO$_3$

A cathode material was prepared in the same manner as Example 1 except that a coating layer was made of LiNbO$_3$.

TEST EXAMPLE

Test Example 1

Figure 3A:
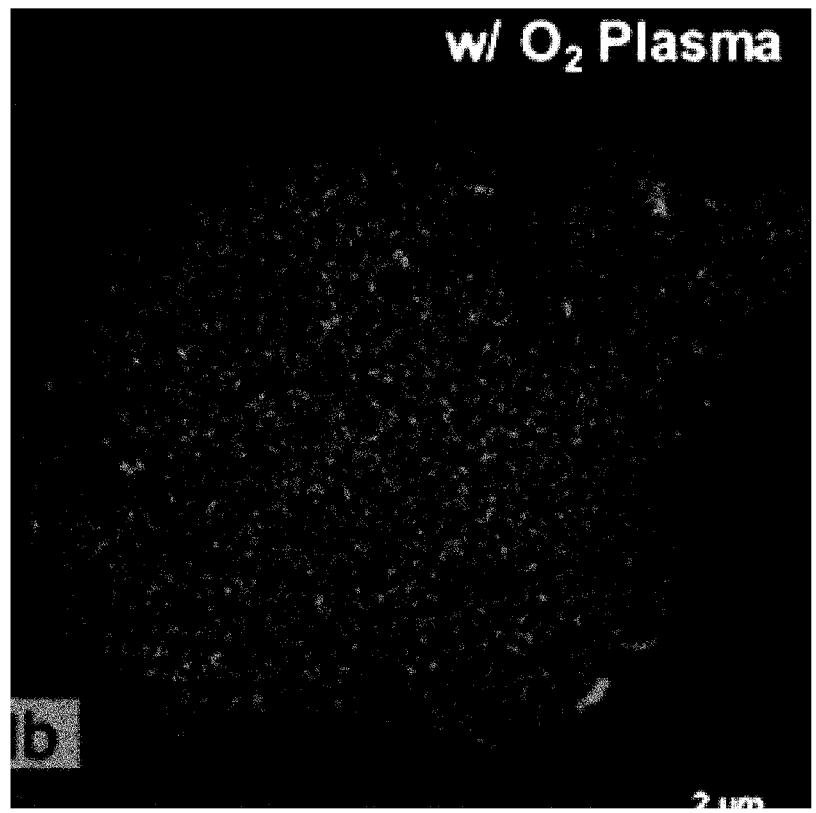
FIG. 3A and FIG. 3B illustrate producing mapping data for a niobium (Nb) element by analyzing a cathode material of Example 1 of the present invention by a transmission electron microscope (TEM) and an energy dispersive X-ray spectroscope (EDS). Particularly.
Figure 3B:
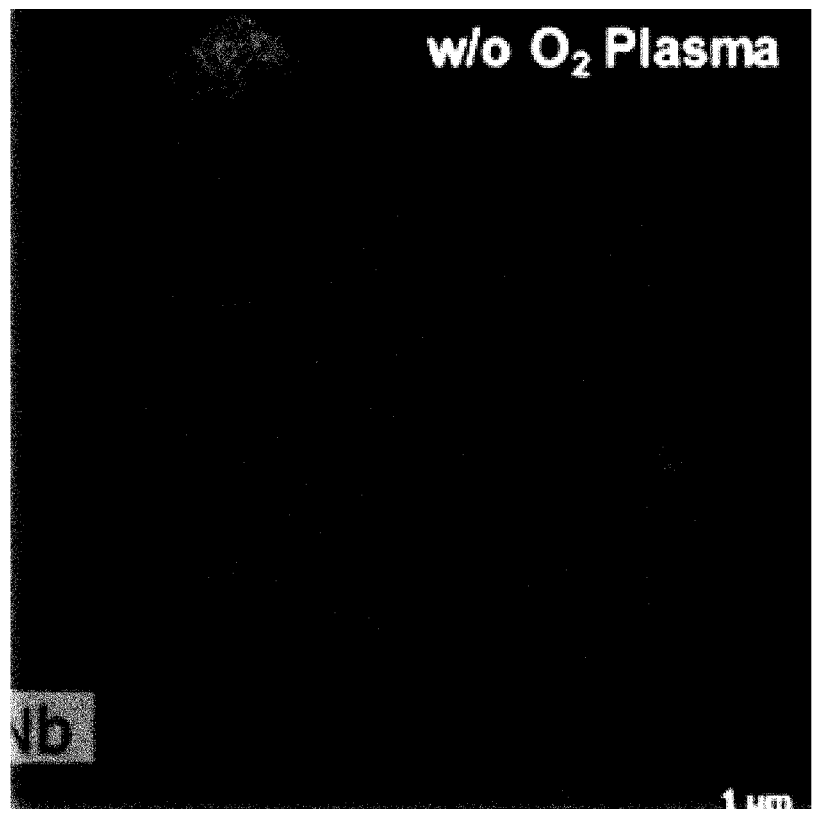

FIG. 3A and FIG. 3B are diagrams illustrating producing mapping data for a niobium (Nb) element by analyzing the cathode material of Example 1 by a transmission electron microscope (TEM) and an energy dispersive X-ray spectroscope (EDS).

Particularly, FIG. 3A illustrates a result for a cathode material in Example 1, and FIG. 3B illustrates a result for a cathode material prepared by the same composition and method as Example 1, except that the surface of a cathode active material powder is not treated with oxygen plasma.

Referring to FIG. 3A and FIG. 3B, like the present invention, it can be seen that in the case of forming a coating layer on the cathode active material having a hydroxyl group on the surface, niobium (Nb) may be evenly distributed without agglomeration.

Test Example 2

The thickness of the coating layer and the element distribution state were confirmed by analyzing the cathode materials of Examples 1, 3 and 4 by the TEM and the EDS. The results were illustrated in FIG. 4, FIG. 5 and FIG. 6.

Figure 4A:
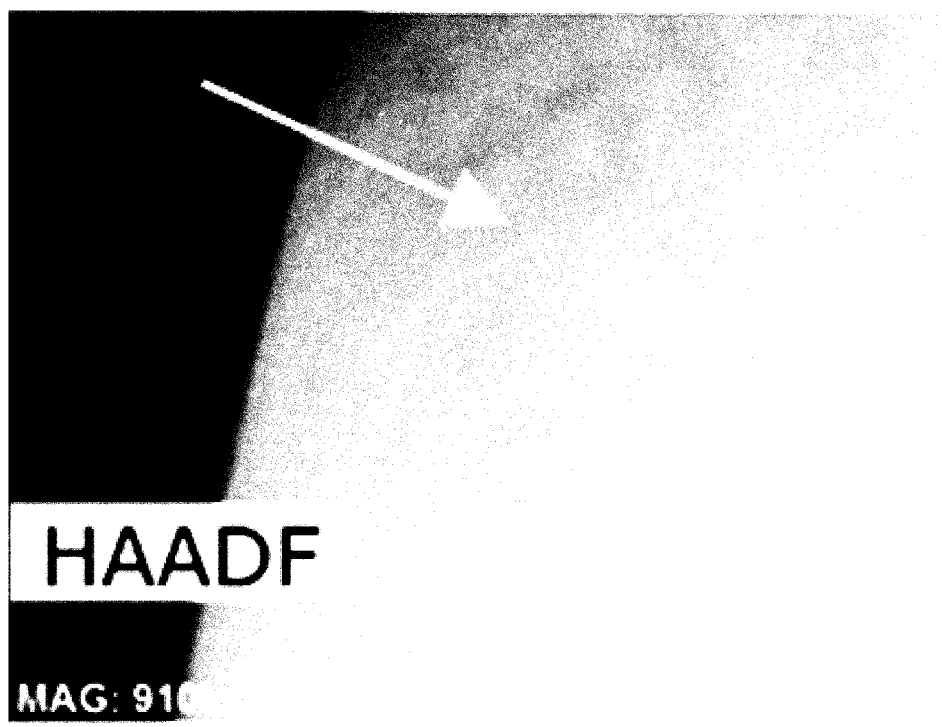
FIG. 4A, FIG. 4B and FIG. 4C illustrate results of analyzing the cathode material of Example 1 of the present invention by a transmission electron microscope (TEM) and an energy dispersive X-ray spectroscope (EDS). Particularly.
Figure 4B:
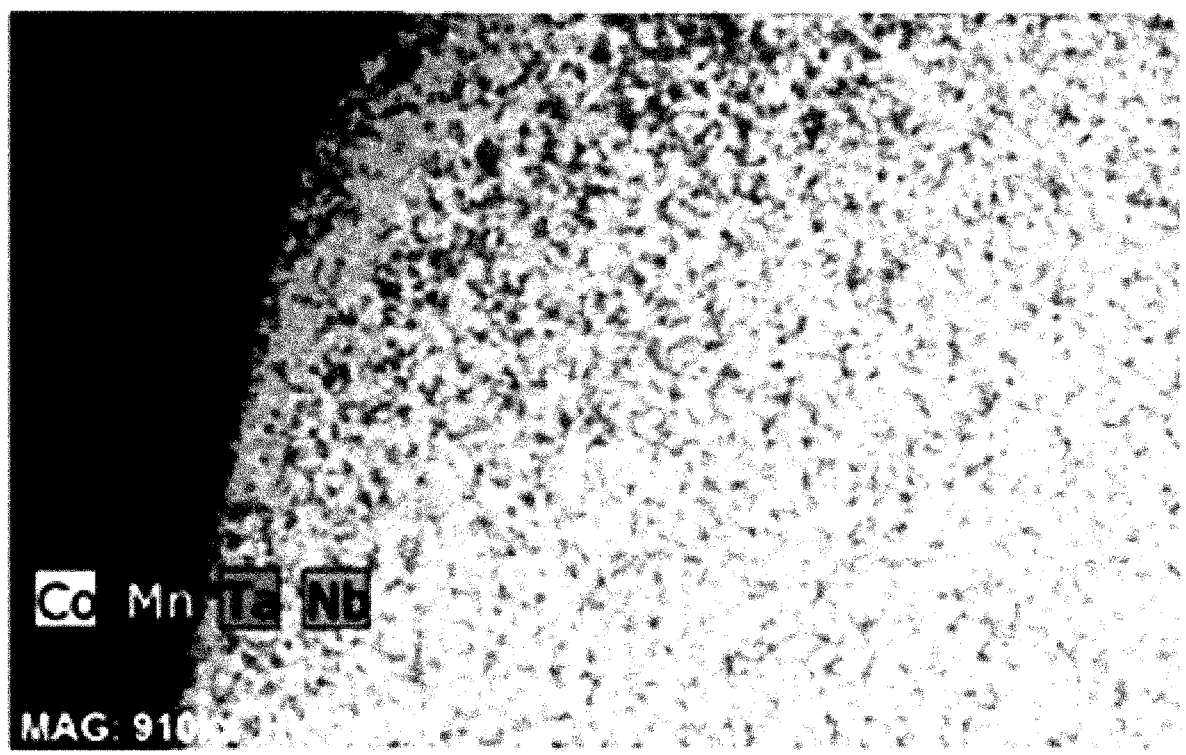
Figure 4C:
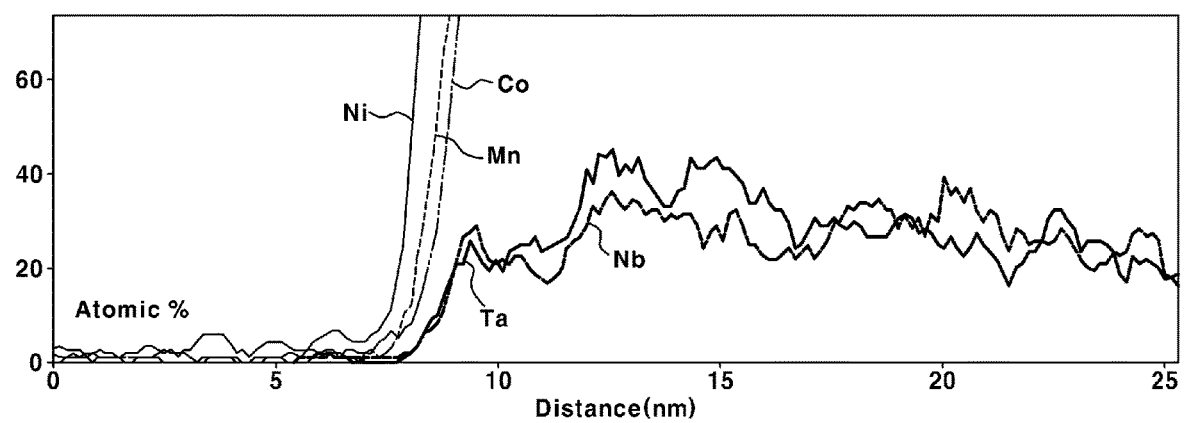

FIG. 4A illustrates an image of the cathode material of Example 1, FIG. 4B illustrates element mapping data of the cathode material of Example 1, and FIG. 4C illustrates a profile of each element up to a predetermined depth from the surface of the cathode material of Example 1. Referring to FIG. 4A and FIG. 4B, it can be seen that in the cathode material of Example 1, the coating layer made of Li(Nb$_{0.6}$Ta$_{0.4}$)O$_3$ is evenly formed on the cathode active material. Referring to FIG. 4C, it can be seen that the thickness of the coating layer is within about 5 nm.

Figure 5A:
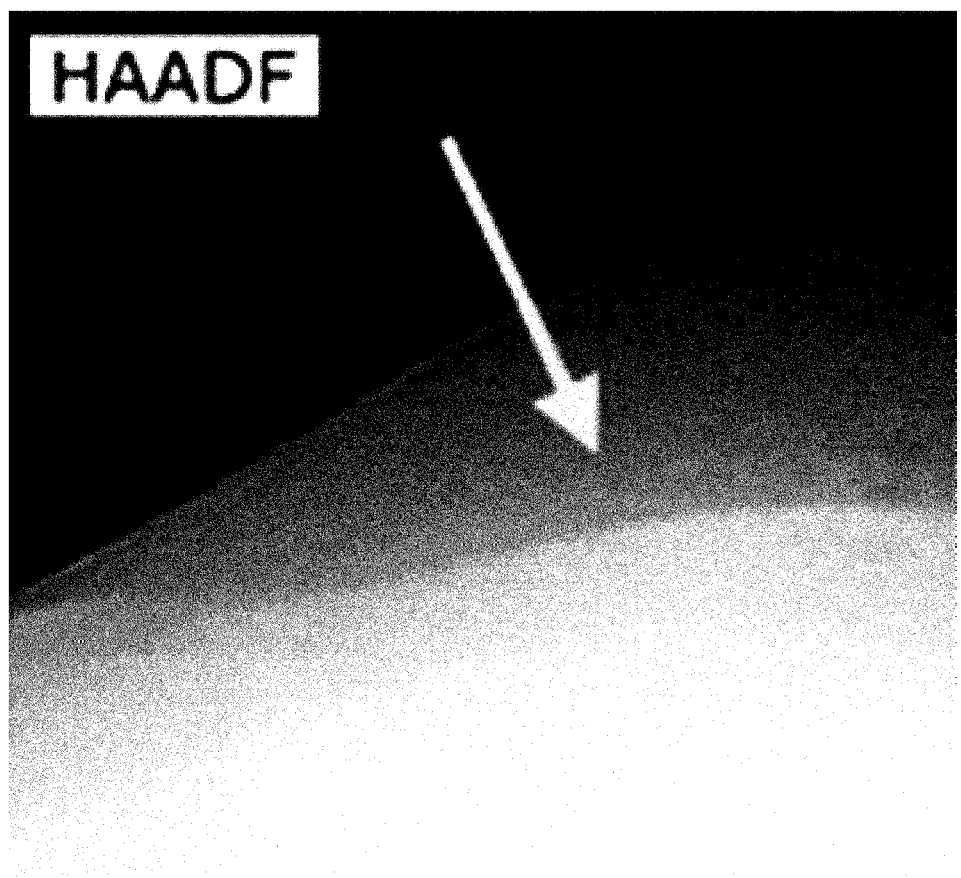
FIG. 5A, FIG. 5B, and FIG. 5C illustrate results of analyzing a cathode material of Example 3 of the present invention by a transmission electron microscope (TEM) and an energy dispersive X-ray spectroscope (EDS). Particularly.
Figure 5B:
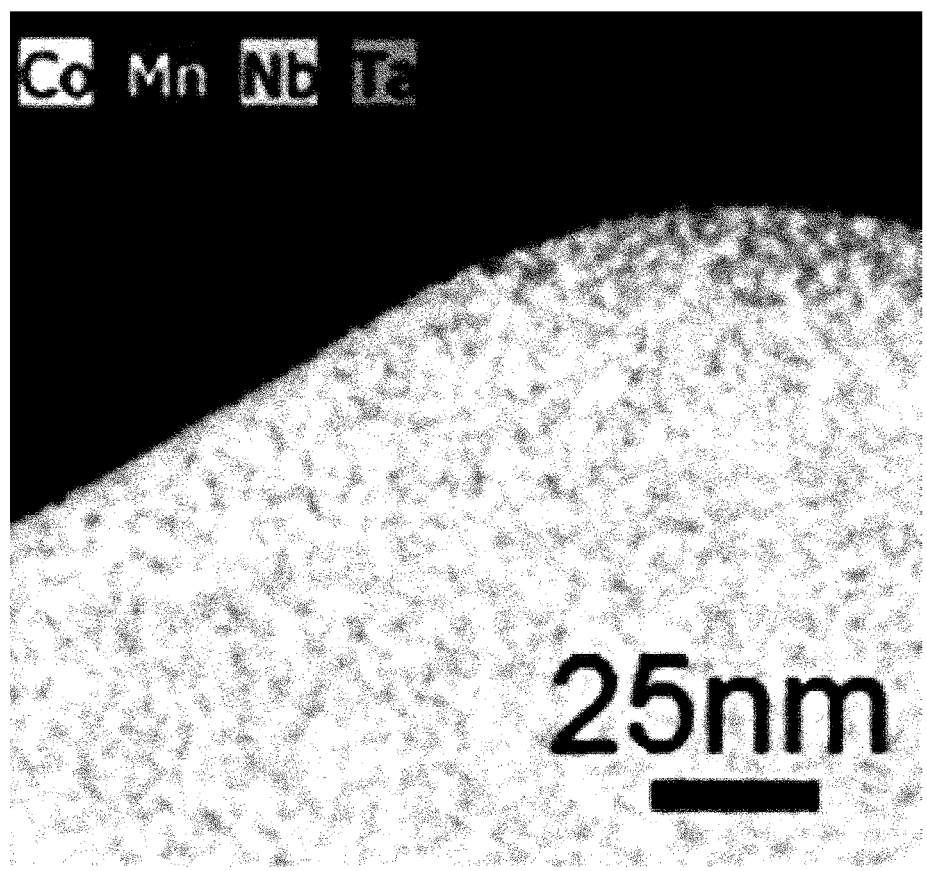
Figure 5C:
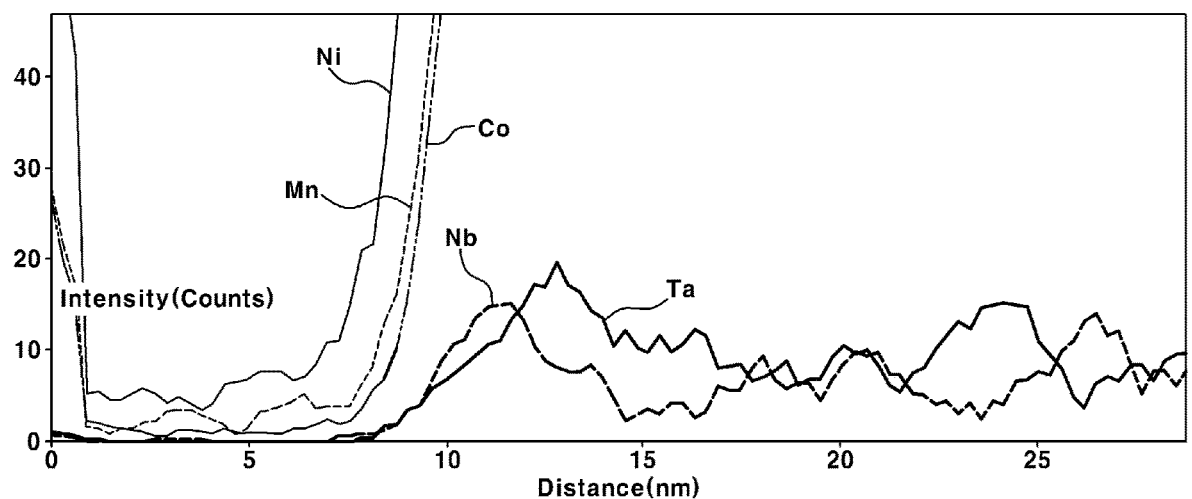

FIG. 5A illustrates an image of the cathode material of Example 3, FIG. 5B illustrates element mapping data of the cathode material of Example 3, and FIG. 5C illustrates a profile of each element up to a predetermined depth from the surface of the cathode material of Example 3. Referring to FIG. 5A and FIG. 5B, it can be seen that in the cathode material of Example 3, the first coating layer made of LiTaO$_3$ and the second coating layer made of LiNbO$_3$ are evenly formed on the cathode active material. Referring to FIG. 5C, it can be seen that the thickness of the coating layer is about 6 nm or more and more niobium (Nb) is detected at the outermost portion where the second coating layer of the cathode material is present.

Figure 6A:
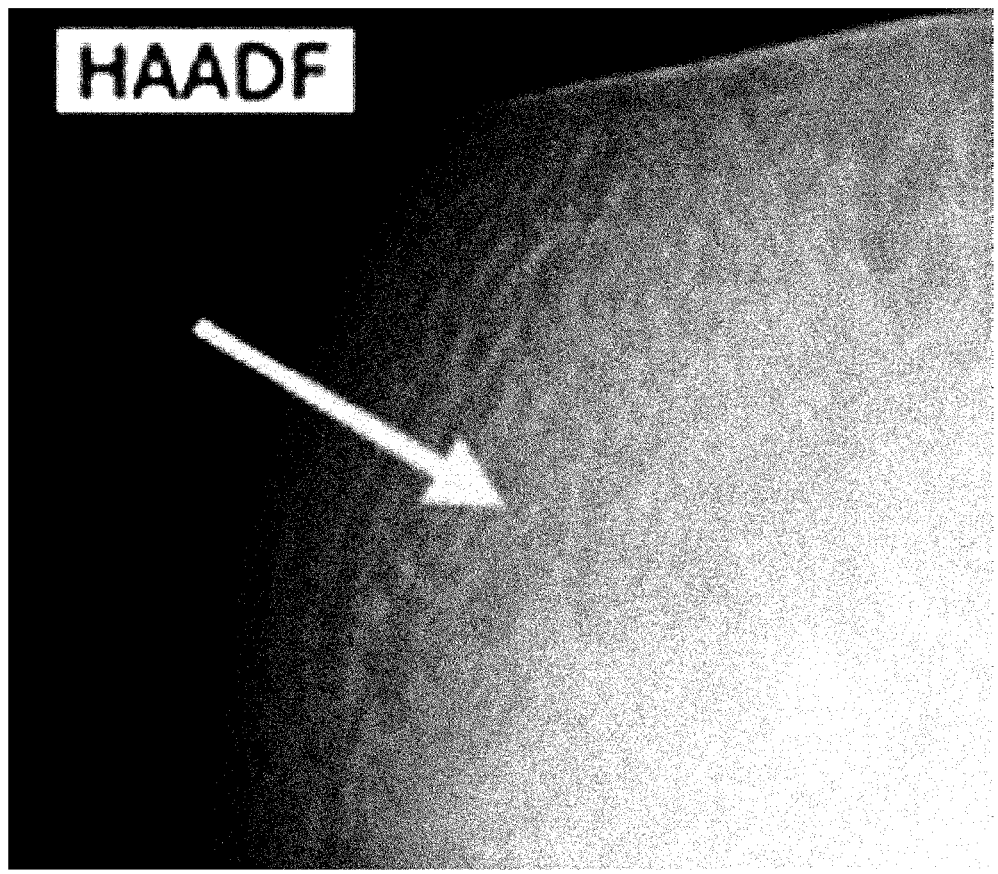
FIG. 6A, FIG. 6B, and FIG. 6C illustrate results of analyzing a cathode material of Example 4 of the present invention by a transmission electron microscope (TEM) and an energy dispersive X-ray spectroscope (EDS). Particularly.
Figure 6B:
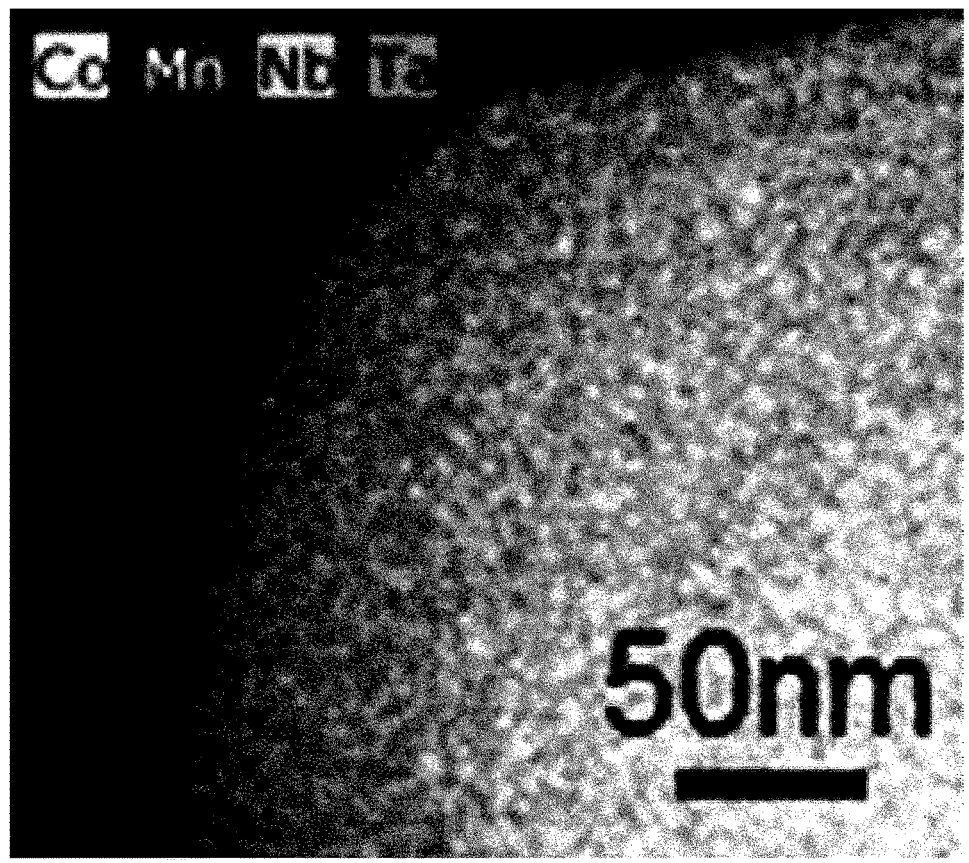
Figure 6C:
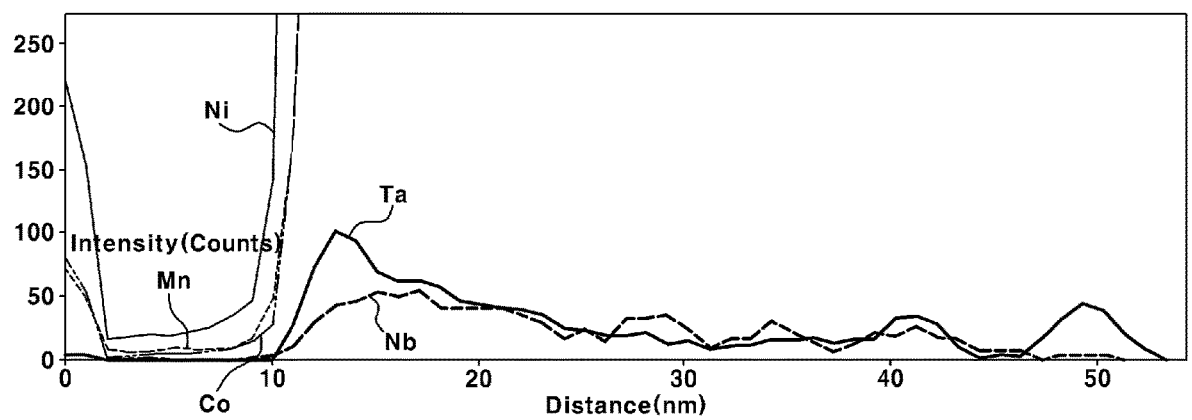

FIG. 6A illustrates an image of the cathode material of Example 4, FIG. 6B illustrates element mapping data of the cathode material of Example 4, and FIG. 6C illustrates a profile of each element up to a predetermined depth from the surface of the cathode material of Example 4. Referring to FIGS. 6A and 6B, it can be seen that in the cathode material of Example 4, the first coating layer made of LiNbO$_3$ and the second coating layer made of LiTaO$_3$ are evenly formed on the cathode active material. Referring to FIG. 6C, it can be seen that the thickness of the coating layer is about 6 nm or more and more tantalum (Ta) is detected at the outermost portion where the second coating layer of the cathode material is present.

Test Example 3

In order to analyze performance of the cathode materials of Examples 1 to 4 and Comparative Examples 1 to 4, a half cell of an all-solid state battery was prepared using the cathode material. Particularly, the cathode material was coated on a mold and a sulfide-based solid electrolyte powder was coated and then pressed on the cathode material to form a cathode-electrolyte layer complex. In the cathode-electrolyte layer complex, an indium foil was attached and pressed to an opposite surface of the cathode to complete the half cell of the all-solid state battery.

Constant current mode charging/discharging was performed based on a cut-off potential of 2.0 to 3.58 V at a rate limiting of 0.3C with respect to the half cell of the all-solid state battery. The results of charging and discharging each half cell once are illustrated in FIGS. 7 and 8.

Figure 7:
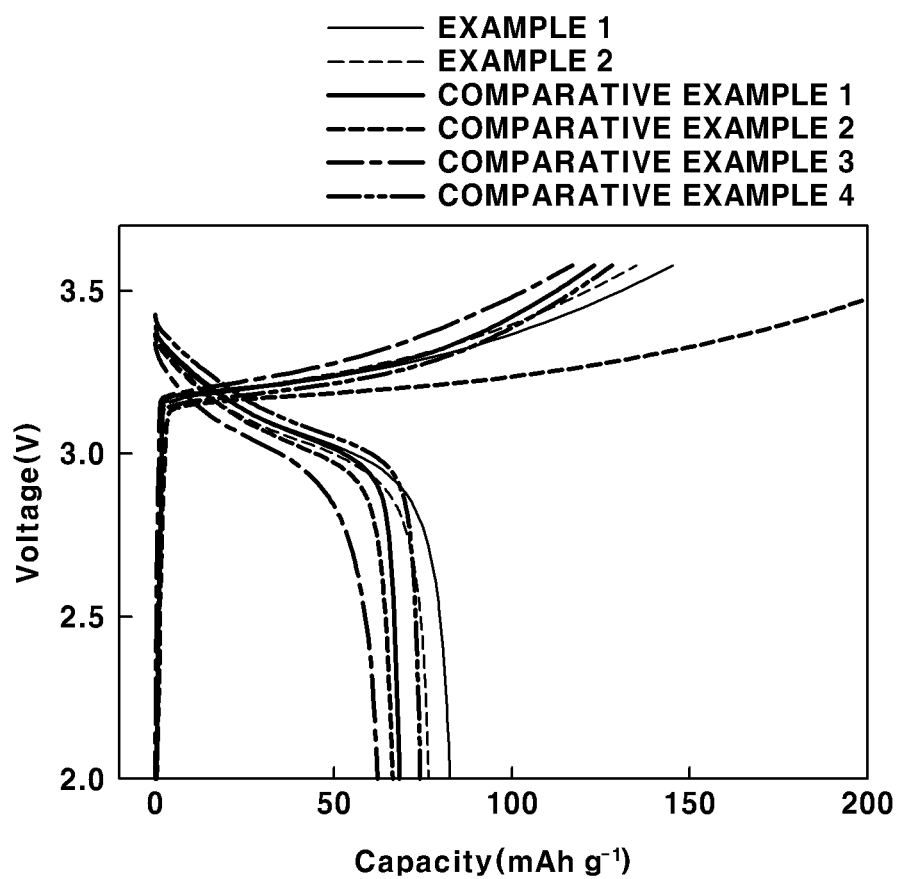
FIG. 7 is a charge and discharge result of a half cell prepared using cathode materials of Examples 1 and 2 of the present invention and Comparative Examples 1 to 4.

FIG. 7 is a charge and discharge result of the half cell prepared using the cathode materials of Examples 1 and 2 and Comparative Examples 1 to 4. Referring to FIG. 7, it can be seen that when the coating layer is made of Li(M1$_x$M2$_{1-x}$)O$_3$, Examples 1 and 2 in which x is 0.4<x<1.0 have excellent charge/discharge performance as compared with Comparative Example 1 (x=0), Comparative Example 2 (x=0.2), Comparative Example 3 (x=0.4), and Comparative Example 4 (x=1).

Figure 8:
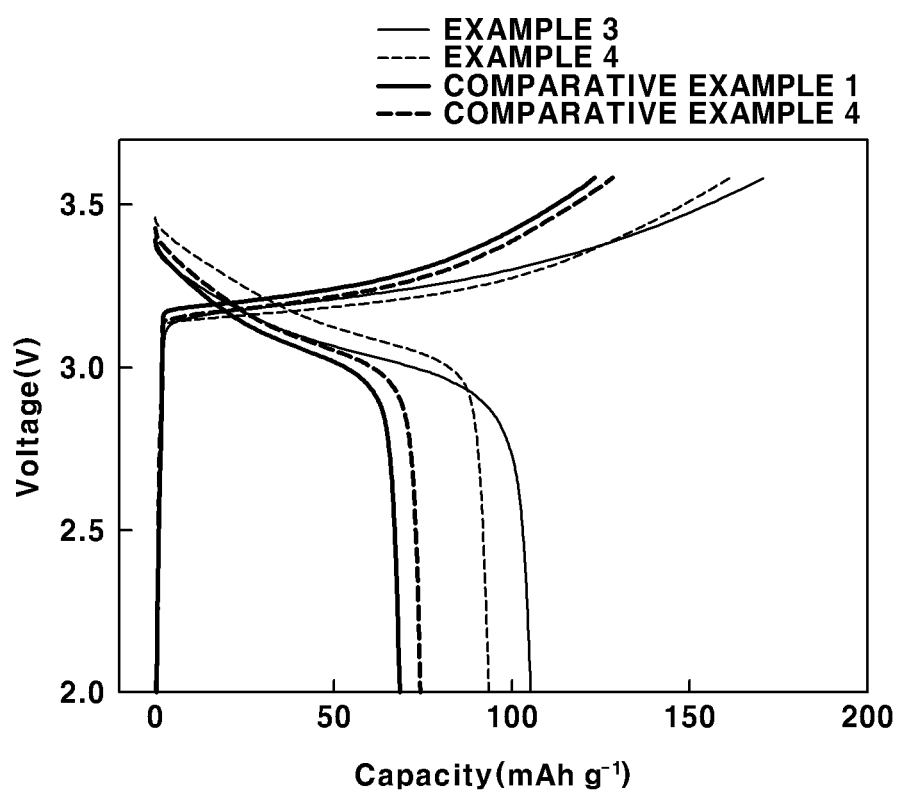
FIG. 8 is a charge and discharge result of a half cell prepared using cathode materials of Examples 3 and 4 of the present invention and Comparative Examples 1 and 2. It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

FIG. 8 is a charge and discharge result of the half cell prepared using the cathode materials of Examples 3 and 4 and Comparative Examples 1 and 4. Referring to FIG. 8, according to an exemplary embodiment of the present invention, it can be seen that Examples 3 and 4 including the coating layer configured by the first coating layer and the second coating layer have excellent charge/discharge performance as compared with Comparative Examples 1 and 4 including a single compound and a single-layered coating layer.

As described above, Test Examples and Examples of the present invention have been described in detail, but the scope of the present invention is not limited to the aforementioned Test Examples and Examples. Furthermore, it will be appreciated by those skilled in the art that changes may be made in these embodiments without departing from the principles and spirit of the invention, the scope of which is defined in the appended claims and their equivalents.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A cathode material for an all-solid state battery, comprising:
    a cathode active material capable of absorbing and desorbing lithium ions; and a coating layer formed on the cathode active material and comprising a first coating layer and a second coating layer formed on the first coating layer,
    wherein the coating layer includes any one compound represented by the Chemical Formula 3 and the Chemical Formula 4:

$LiTaO_3$ [Chemical Formula 3]

$LiNbO_3$ [Chemical Formula 4]

wherein the first coating layer and the second coating layer includes different compounds,
    wherein a thickness of the first coating layer is about 1 nm to about 100 nm,
    wherein a content of the first coating layer is about 0.125 wt % to about 0.25 wt % with respect to 100 wt % of the cathode material,
    wherein a thickness of the second coating layer is about 1 nm to about 100 nm, and
    wherein a content of the second coating layer is about 0.125 wt % to about 0.25 wt % with respect to 100 wt % of the cathode material.

2. The cathode material for the all-solid state battery of claim 1, wherein the cathode active material is lithium transition metal oxide.

3. The cathode material for the all-solid state battery of claim 1, wherein the cathode active material has a hydroxyl group on the surface.

* * * * *